UNITED STATES PATENT OFFICE.

JOHN D. MILLER, OF NORFOLK, VIRGINIA, ASSIGNOR OF ONE-HALF TO LOUIS FEUERSTEIN, SR., OF NORFOLK, VIRGINIA.

PROCESS OF DAMP-PROOFING SALT.

1,140,995.

Specification of Letters Patent. Patented May 25, 1915.

No Drawing. Application filed December 27, 1913. Serial No. 808,996.

*To all whom it may concern:*

Be it known that I, JOHN D. MILLER, a citizen of the United States, residing at Norfolk, in the county of Norfolk and State of Virginia, have invented certain new and useful Improvements in Processes of Damp-Proofing Salt, of which the following is a specification.

The object of my invention is to treat salt to render it damp-proof so that no matter what climatic conditions it is subject to, it will always retain its granular form and run easily from containers.

Heretofore considerable trouble, and annoyance, has been experienced from the fact that salt, when subjected to a damp atmospheric condition, lumps up and it is impossible to shake it from the usual table salt containers, besides which it cakes in the original packages to such an extent that it is necessary to repowder it. Many expedients have been adopted by salt manufacturers to overcome these objections above noted but without avail.

After many experiments, and under all climatic conditions I have found that salt treated, as will be hereinafter described, is damp-proof, will run easily from containers, and at the same time is just as efficient as a condiment, as untreated salt, and will give equal results with a like quantity as untreated salt.

In my process of treating salt, I use one pound of magnesia, more or less and one pound of stearic acid, more or less, to eight hundred to one thousand pounds of salt according to the degree of damp-proof required, which can be readily ascertained. I grind the stearic acid to a fine powder and then mix with it, in equal portions magnesia, by agitation, place this mixture in a heated chamber having a temperature sufficiently high to melt the stearic acid and continuously agitate and mix the mixture while it is in said heated chamber until stearic acid is thoroughly melted and it and the magnesia are thoroughly and intimately mixed and intermingled. After treatment in this heated chamber, I run the compound off and permit it to cool, after which I grind the compound to a fine powder and bolt said powder through a very fine screen, after which it is ready for mixing with salt to render the salt damp-proof.

In treating salt with this damp-proof compound, I first place a predetermined quantity of salt in a heated chamber and keep it there until it has been thoroughly heated, I then introduce my compound into said chamber and thoroughly and intimately mix the compound and salt, preferably by suitable agitator blades or screws and retain the salt and compound in said chamber for a given time. The treated salt is then withdrawn from the heated chamber and permitted to cool, after which it is packed in suitable commercial packages.

I have found that stearin may be used for treating salt for some climatic conditions.

This process has been operated commercially by me and the product thereof has been demonstrated to successfully damp-proof salt so that it retains its clear crystal condition, runs freely under all climatic conditions and at the same time has the same pungent taste as untreated salt.

What I claim is:

1. The process of damp-proofing salt which consists in heating the salt, and thoroughly mixing therewith, while in a heated state, stearic acid and magnesia, and agitating the mass until all of its parts are intimately mixed.

2. A condiment comprising salt, stearic acid and magnesia.

In testimony whereof I affix my signature in presence of two witnesses.

JOHN D. MILLER.

Witnesses:
H. T. CRUSER, Jr.,
C. H. FERRELL.